United States Patent
Shields et al.

(10) Patent No.: US 6,304,261 B1
(45) Date of Patent: *Oct. 16, 2001

(54) OPERATING SYSTEM FOR HANDHELD COMPUTING DEVICE HAVING PROGRAM ICON AUTO HIDE

(75) Inventors: Kevin Timothy Shields; Raymond A. Manning, both of Redmond; Anthony Kitowitz, Kirkland, all of WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/301,506

(22) Filed: Apr. 28, 1999

Related U.S. Application Data

(63) Continuation of application No. 08/873,052, filed on Jun. 11, 1997, now Pat. No. 5,910,802.

(51) Int. Cl.[7] .................................................. G06F 3/00
(52) U.S. Cl. ............................................. 345/358; 345/348
(58) Field of Search .................................. 345/338, 336–337, 345/333, 347, 358, 173, 180, 348, 349

(56) References Cited

U.S. PATENT DOCUMENTS

| 5,327,161 |   | 7/1994  | Logan et al.     | 345/173 X |
|-----------|---|---------|------------------|-----------|
| 5,406,307 | * | 4/1995  | Hirayama et al.  | 345/120   |
| 5,473,745 | * | 12/1995 | Berry et al.     | 345/358   |
| 5,594,471 | * | 1/1997  | Deeran et al.    | 345/173   |
| 5,617,526 |   | 4/1997  | Oran et al.      | 345/348 X |
| 5,745,109 |   | 4/1998  | Nakano et al.    | 345/340   |
| 5,757,368 | * | 5/1998  | Gerpheide et al. | 345/339   |
| 5,757,371 |   | 5/1998  | Oran et al.      | 345/348   |
| 5,910,802 | * | 6/1999  | Shields et al.   | 345/347   |

* cited by examiner

*Primary Examiner*—Steven Sax
(74) *Attorney, Agent, or Firm*—Lee & Hayes, PLLC

(57) ABSTRACT

A portable handheld computing device has a processor and a touch-sensitive display. The display includes a touch-sensitive area superimposed on a viewing area, whereby the touch-sensitive area extends beyond the viewing area to form a border outside of the viewing area but within the touch-sensitive area. The handheld computing device has an operating system that executes on the processor to provide a graphical user interface environment capable of presenting a program taskbar within the viewing area. The operating system is configured to present a taskbar within the viewing area in response to contact from a stylus in the border beneath the viewing area.

25 Claims, 3 Drawing Sheets

OPERATING SYSTEM FOR HANDHELD COMPUTING DEVICE HAVING PROGRAM ICON AUTO HIDE

The present application is a continuation of U.S. patent application Ser. No. 08/873,052, now U.S. Pat. No. 5,910,802 filed Jun. 11, 1997, issued Jun. 8, 1999.

TECHNICAL FIELD

This invention relates to portable handheld computing devices, such as handheld personal computers (H/PCs).

BACKGROUND OF THE INVENTION

Small, handheld computing devices have been steadily growing in popularity in recent years. The devices go by different names, including palmtops, pocket computers, personal digital assistants, personal organizers, and the like. In this disclosure, this class of computing devices is generally referred to as "handheld personal computers", "handheld PCs", or "H/PCs".

H/PCs are small, pocket-sized devices having an LCD (liquid crystal display) with a touch-sensitive screen, a stylus to enter data through the screen, and an input device such as a keypad or miniature QWERTY keyboard. H/PCs have a microprocessor, memory, and are capable of running an operating system and one or more applications on the operating system. Microsoft Corporation recently released the Windows CE operating system for use on H/PCs, which is a scaled-down version of its popular Windows operating systems manufactured for personal computers.

One of the most desirable characteristics of H/PCs is their portability. The compact, portable H/PCs provide a user with real computer-like applications—such as email, PIM (personal information management), Internet browser, spreadsheet, word processing. A traveling user can receive email messages, schedule meetings or appointments, and browse the Internet from the H/PC.

Chief among the design compromises is an undersized display. Screen space is very limited. Traditional user interface techniques which users are accustomed to on desktop computers are not available for H/PC displays due to the limited size. Additionally, the screen must be efficiently utilized to enable effective data input from the stylus.

In view of this design constraint, it would be advantageous to develop user interfaces that can be effectively employed on the miniaturized screen of a handheld computing device.

SUMMARY OF THE INVENTION

This invention concerns a portable handheld computing device having an operating system with improved user interfaces for miniaturized screens.

The handheld computing device has a processor and a touch-sensitive display. The display includes a touch-sensitive area superimposed on a viewing area, whereby the touch-sensitive area extends slightly beyond the viewing area to form a border outside of the viewing area but within the touch-sensitive area. The handheld computing device has an operating system that executes on the processor to provide a graphical user interface environment capable of presenting a program taskbar within the viewing area.

The operating system is configured to alternately present and hide a taskbar within the viewing area in response to contact from a stylus or other tool in the border beneath the viewing area. When the taskbar is hidden, the user taps the border to make the taskbar reappear within the viewing area. When the taskbar is visible, the user transfers focus to any place other than the taskbar, such as by tapping a program icon or tapping an active window, to make the taskbar disappear.

BRIEF DESCRIPTION OF THE DRAWINGS

The same reference numbers are used throughout the drawings to reference like components and features.

DETAILED DESCRIPTION OF THE PREFERRED EMBODIMENT

Figure 1:
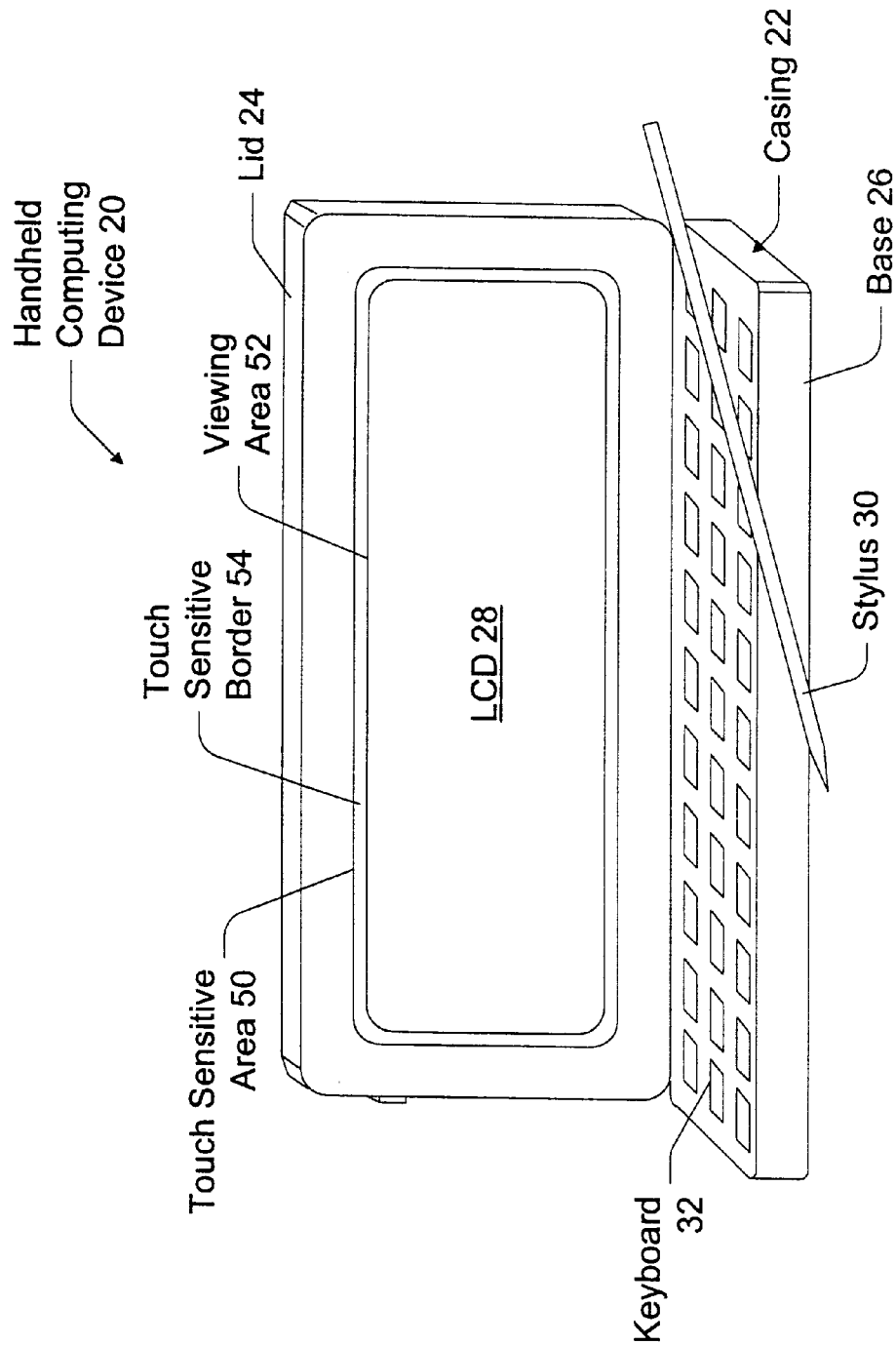
FIG. 1 is a perspective view of a handheld computing device in an open position.

FIG. 1 shows a handheld computing device 20. As used herein, "handheld computing device" means a small computing device having a processing unit that is capable of running one or more application programs, a display, and an input mechanism such as a keypad, a touch-sensitive screen, a track ball, a touch-sensitive pad, a miniaturized QWERTY keyboard, or the like.

The handheld computing device 20 is embodied as a handheld personal computer. The terms "handheld computing device" and "handheld personal computer" (or handheld PC or H/PC) are used interchangeably throughout this disclosure. However, in other implementations, the handheld computing device may be implemented as a personal digital assistant (PDA), a personal organizer, a palmtop computer, a computerized notepad, or the like.

Handheld computing device 20 has a casing 22 with a cover or lid 24 and a base 26. The handheld computing device 20 has a liquid crystal display (LCD) 28 with a touch-sensitive screen mounted to the lid 24. The lid 24 is hingedly connected to the base 26 to pivot between an open position, which exposes display 28, and a closed position, which protects the display. The device is equipped with a stylus 30 to enter data through the touchscreen display 28 and a miniature QWERTY keyboard 32. The stylus 30 and keyboard 32 are both mounted in base 26.

The handheld computing device 20 can also be implemented with a wireless transceiver (not shown) such as an IR (infrared) transceiver and/or an RF (radio frequency) transceiver. Although the illustrated implementation shows a two-member H/PC 20 with a lid 24 and a base 26, other implementations of the H/PC ii might comprise an integrated body without hinged components, as is the case with computerized notepads (e.g., Newton® from Apple Computers).

Figure 2:
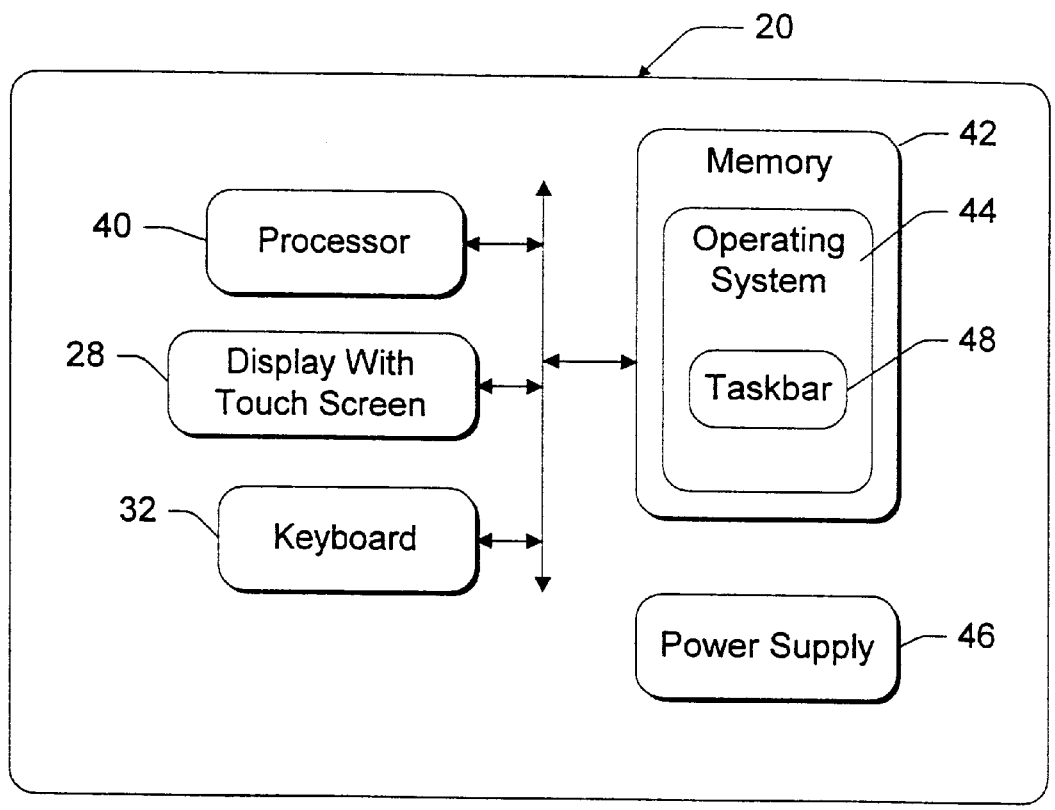
FIG. 2 is a block diagram of the handheld computing device.

FIG. 2 shows functional components of the handheld computing device 20. It has a processor 40, a memory 42, a display 28, and a keyboard 32. The memory 42 generally includes both volatile memory (e.g., RAM) and non-volatile memory (e.g., ROM, PCMCIA cards, etc.). An operating system 44 is resident in the memory 42 and executes on the processor 40. The operating system 44 is a multitasking operating system that allows simultaneous execution of multiple applications. The operating system employs a graphical user interface windowing environment that presents applications and documents in specially delineated areas of the display screen called "windows." Each window can act independently, including its own menu, toolbar, pointers, and other controls, as if it were a virtual display device. It is noted, however, that the handheld computing device may be implemented with other types of operating systems that support a window environment.

The operating system 44 is preferably the Windows CE operating system from Microsoft Corporation that is configured to include the "auto hide" feature discussed below, as represented by the taskbar manager 48. The Windows CE operating system is a derivative of Windows brand operating systems, such as Windows 95, that is especially designed for handheld computing devices.

The H/PC 20 has a power supply 46 that supplies power to the electronic components. The power supply 46 is preferably implemented as one or more batteries. The power supply 46 might further represent an external power source that overrides or recharges the built-in batteries, such as an AC adapter or a powered docking cradle.

One feature in the popular Windows 95 operating system for desktop computers is the "auto hide" feature. This feature enables a user to set an option in which the bottom taskbar user interface (which supports the well-known "Start" button) alternately hides and reappears depending upon the position of the mouse pointer. When the pointer is operating over the primary viewing area of the screen, the taskbar UI is hidden; however, when the user positions the mouse pointer near the bottom of the screen, the taskbar reappears. In addition to the mouse pointer, the taskbar UI appears by transferring focus to the taskbar UI (such as by depressing the "Tab" key until focus is on the taskbar UI, or by depressing the "Windows" button on specially configured keyboards), or disappears by transferring focus away from the taskbar UI. The auto hide feature enables more efficient use of the display space.

Due to limited screen space and the use of a stylus and touch screen to enter data, handheld PCs do not support a mouse pointer. Accordingly, the conventional technique for implementing the "auto hide" feature cannot be imported to the operating system 44 of the H/PC 20.

An aspect of this invention pertains to a new user interface for achieving the "auto hide" feature in a handheld PC. The operating system 44 has a taskbar manager 48 to control when the taskbar appears and when it is hidden. Normally, when the auto hide feature is activated, the taskbar is kept hidden on the screen.

Figure 3:
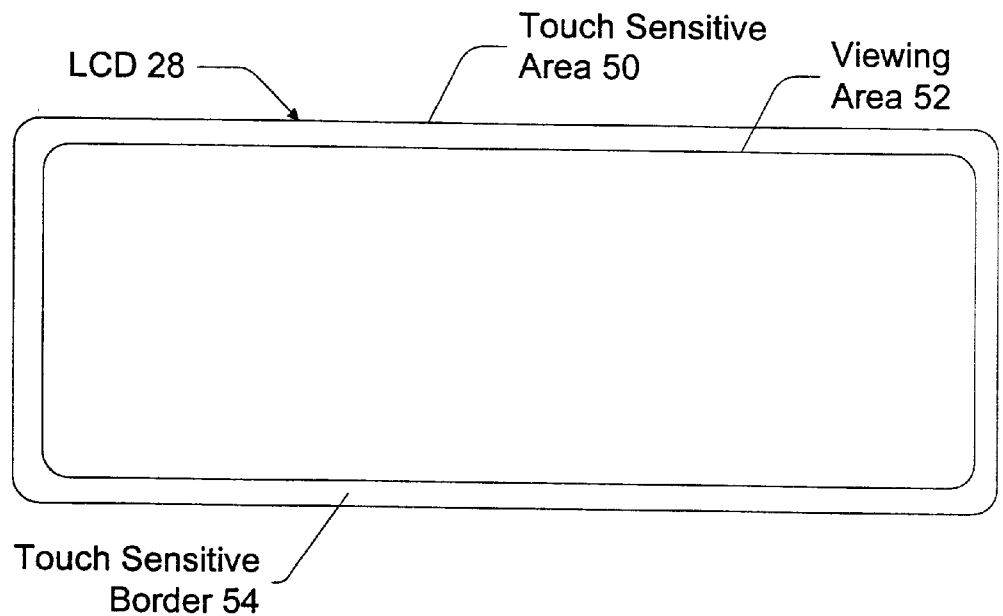
FIG. 3 is a diagrammatic illustration of a touch-sensitive display utilized in the handheld computing device.

FIG. 3 shows the LCD 28 in more detail. It comprises a touch-sensitive screen having a touch-sensitive area 50 superimposed on a viewing area 52. The touch-sensitive area 50 extends slightly beyond the viewing area 52 to form a border 54. The border 54 is inside the touch-sensitive area 50 and responsive to touch contact from the stylus, but is outside of the viewing area 52. The border 54 may surround the viewing area 52, as shown in FIG. 3, or run along one or more sides of the viewing area.

The taskbar UI is hidden in FIG. 3. To make it reappear, the user taps the border 54. More specifically, in one example configuration, the user preferably taps the portion of border 54 beneath the viewing area 52. The taskbar manager 48 interprets this contact as a request to see the taskbar. Accordingly, the operating system 44 is configured to make the taskbar reappear, after being hidden, within the viewing area 52 in response to contact in the lower border 54. It is noted that the border 54 may also include a small fraction of the viewing area 52. For instance, the lower two-to-four pixel rows may be incorporated into the border for purposes of requesting the taskbar UI. This is particularly useful in embodiments where the border 54 is narrow due to the LCD design.

Figure 4:
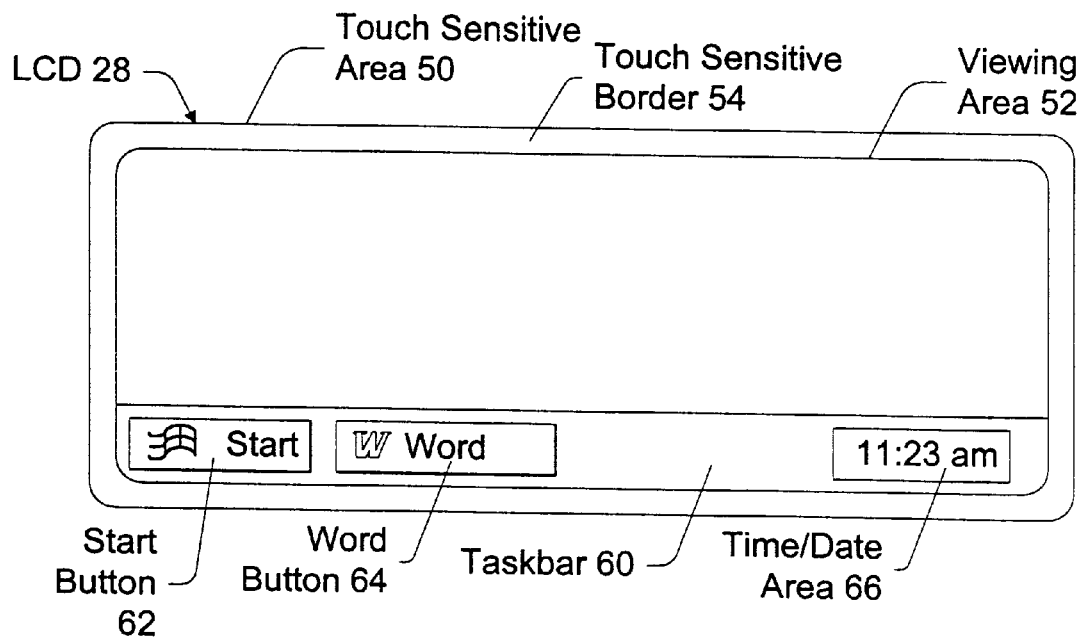
FIG. 4 is a diagrammatic illustration of a taskbar user interface presented within a viewing area of the FIG. 3 display.

FIG. 4 shows the LCD 28 with a taskbar 60 along the bottom of viewing area 52. The taskbar UI 60 resembles the familiar taskbar of the Windows 95 operating system. It presents the "Start" button 62 and active application icons, as represented by the "Word" button 64 for the word processing program manufactured and sold by Microsoft Corporation under the trademark Word. The taskbar UI 60 also has a time/date area 66.

It is noted that the taskbar may be rearranged along a side of the screen or across the top of the screen. In this case, the preferred location for tapping the border 54 might be along the side border if the taskbar UI is to appear on the side of the screen, or the top portion of the border 54 if the taskbar is to appear across the top of the screen.

When the user desires to hide the taskbar 60, the user transfers focus to some location other than the taskbar 60. For instance, the user might touch the screen, or an icon on the screen, or an active window on the screen. This action transfers focus from the taskbar 60 to another location. The taskbar manager 48 interprets this action to remove the taskbar 60 and return the viewing area 52 to full-screen as shown in FIG. 3.

It is noted that the taskbar may be hidden using other techniques. One technique for alternately hiding and showing the taskbar 60 is to press the "tab" key to transfer focus to and from the taskbar. Another technique is to depress a "windows" key on the keyboard 32 (if one exists) to make the taskbar appear. Still another alternative is to have the taskbar time out, so that it disappears after a predetermined time period has elapsed.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A handheld computing device comprising:
    a processor;
    a touch-sensitive display having a touch-sensitive area superimposed on a graphical user interface (GUI) area, the touch-sensitive area extending beyond the GUI area to form a region outside of the GUI area; and
    an operating system execution the processor to provide a GUI environment and to present or hide one or more program icons within the GUI area in response to contact in the region.

2. A handheld computing device as recited in claim 1, wherein the region is beneath the GUI area.

3. A handheld computing device as recited in claim 1, wherein the region includes a narrow portion of the GUI area.

4. A handheld computing device as recited in claim 1, wherein if the program icons are visible, the operating system is configured to hide the program icons in response to transferring focus to a location other than the program icons.

5. A handheld computing device as recited in claim 1, further comprising a keypad having multiple keys, and wherein if the program icons are visible, the operating system is configured to hide the program icons in response to transferring focus to a location other than the program icons by depressing at least one key on the keypad.

6. A handheld computing device as recited in claim 1, wherein if the program icons are visible, the operating system is configured to hide the program icons after a predefined time period elapses so that the program icons are no longer visible.

7. A handheld computing device as recited in claim 1, wherein if the program icons are visible, the operating system is configured to hide the program icons in response to contact in a section of the GUI area other than the program icons so that the program icons are no longer visible.

8. A handheld computing device comprising:

a processor;

a touch-sensitive display having a touch-sensitive area juxtaposed to an imaging area wherein changeable images can be presented, the touch-sensitive area extending beyond the imaging area to form a region outside of the imaging area but within the touch-sensitive area; and an operating system executing on the processor to provide a graphical user interface environment and to present or bide one or more icons within the imaging area in response to contact in the region.

9. A handheld computing device as recited in claim 8, wherein if the icons are visible, the operating system is configured to hide the icons in response to an event selected from a group of events comprising:

(1) elapse of a predefined time period;

(2) transferring focus to a location other than the icons; and (3) contacting a section of the touch-sensitive area other than the icons.

10. For a handheld computing device having a touch-sensitive display, an operating system embodied on a computer-readable medium comprising:

wherein the touch-sensitive display comprises a touch-sensitive area superimposed on a graphical user interface (GUI) area that supports at least one program icon, the touch-sensitive display extending beyond the GUI area to form a region outside of the GUI area; and computer-executable instructions to provide the GUI and to present or hide the at least one program icon in response to contact in the region.

11. An operating system as recited in claim 10, further configured to hide the program icon from the GUI area in response to transferring focus to a location other than the program icon.

12. An operating system as recited in claim 10, further configured to hide the program icon from the GUI area after a predefined time period elapses.

13. An operating system as recited in claim 10, further configured to hide the program icon from the GUI area in response to contact in a section of the GUI area other than the program icon.

14. For a handheld computing device having a touch-sensitive display, an operating system embodied on a computer-readable medium comprising:

wherein the touch-sensitive display comprises a touch-sensitive area juxtaposed to an imaging area wherein changeable images can be presented, the touch-sensitive area extending beyond the imaging area to form a region outside of the imaging area; and computer-executable instructions to provide a graphical user interface environment and to present or hide at least one icon within the imaging area in response to contact in the region.

15. An operating system as recited in claim 14, further configured to hide the icon in response to an event selected from a group of events comprising:

(1) elapse of a predefined time period;

(2) transferring focus to a location other than the icons; and (3) contacting a section of the touch-sensitive area other than the icons.

16. A method for operating a handheld computing device having a touch-sensitive display, the method comprising:

wherein the touch-sensitive display comprises a touch-sensitive area superimposed on a graphical user interface (GUI) area that supports at least one program icon, the touch-sensitive display extending beyond the GUI area to form a region outside of the GUI area;

presenting the GUI area; and presenting or hiding the at least one program icon in response to contact in the region.

17. A method as recited in claim 16, further comprising hiding the program icon so that the program icon is no longer visible in response to transferring focus to a location other than the program icon.

18. A method as recited in claim 16, further comprising hiding the program icon so that the program icon is no longer visible after a predefined time period elapses.

19. A method as recited in claim 16, further comprising hiding the program icon so that the program icon is no longer visible in response to contact in a section of the viewing area other than the program icon.

20. An operating system embodied on a computer-readable medium having computer-executable instructions for performing the method as recited in claim 16.

21. A computer-readable medium having computer-executable instructions for performing the method as recited in claim 16.

22. A method for operating a handheld computing device having a touch-sensitive display, the method comprising:

wherein the touch-sensitive display comprises a touch-sensitive area superimposed on a graphical user interface (GUI) area that supports at least one program icon, the touch-sensitive display extending beyond the GUI area to form a region outside of the GUI area;

presenting the GUI area; and presenting or hiding the at least one icon in the imaging area in response to contact in the region.

23. A method as recited in claim 22, further comprising hiding the icon in response to an event selected from a group of events comprising:

(1) elapse of a predefined time period;

(2) transferring focus to a location other than the icons; and (3) contacting a section of the touch-sensitive area other than the icons.

24. An operating system embodied on a computer-readable medium having computer-executable instructions for performing the method as recited in claim 22.

25. A computer-readable medium having computer-executable instructions for performing the method as recited in claim 22.

* * * * *

UNITED STATES PATENT AND TRADEMARK OFFICE
CERTIFICATE OF CORRECTION

PATENT NO.     : 6,304,261 B1
DATED          : October 16, 2001
INVENTOR(S)    : Kevin Timothy Shields et al.

It is certified that error appears in the above-identified patent and that said Letters Patent is hereby corrected as shown below:

Column 2,
Line 54, delete "ii" after "H/PC".

Column 4,
Line 50, replace "execution" with -- executing --.

Column 5,
Line 23, replace "bide" with -- hide --.

Signed and Sealed this

Nineteenth Day of March, 2002

Attest:

JAMES E. ROGAN
Attesting Officer     Director of the United States Patent and Trademark Office